F. G. PARTINGTON.
DRINKING CUP FOUNTAIN.
APPLICATION FILED DEC. 23, 1913.
Reissued Apr. 13, 1915. 13,902.
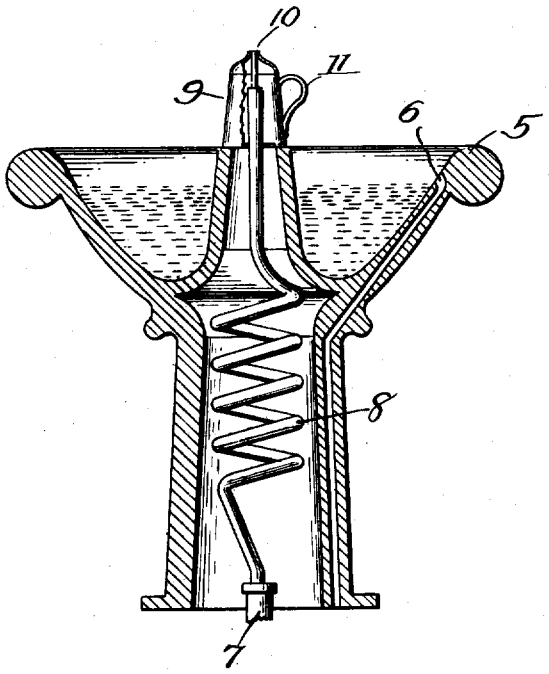
Inventor
Frederick G. Partington
Witnesses
Lo. B. James
A. F. Bordner
By R. Peale Hunick Attorney

UNITED STATES PATENT OFFICE.

FREDERICK GEORGE PARTINGTON, OF SPOKANE, WASHINGTON.

DRINKING-CUP FOUNTAIN.

13,902. Specification of Reissued Letters Patent. Reissued Apr. 13, 1915.

Original No. 1,011,364, dated December 12, 1911, Serial No. 613,335. Application for reissue filed December 23, 1913. Serial No. 808,510.

*To all whom it may concern:*

Be it known that I, FREDERICK GEORGE PARTINGTON, a citizen of the United States, residing at Spokane, in the county of Spokane and State of Washington, have invented certain new and useful Improvements in Drinking-Cup Fountains, of which the following is a specification.

This invention relates to drinking fountains and more particularly to public drinking fountains, the object of the invention being to provide a structure wherein a continuous flow of water is maintained at a drinking nozzle but said drinking nozzle is in the form of a cup adapted to be grasped and lifted to the mouth, whereby the user is enabled to drink from the cup without the necessity of bending or stooping to an uncomfortable position.

Further objects and advantages of the invention will be set forth in the detailed description which now follows.

In the accompanying drawing, the figure is a view partly in section and partly in elevation of a public drinking fountain constructed in accordance with the invention.

Referring to the drawing, the numeral 5 designates a bowl or stand having an overflow opening 6.

7 is a pipe constituting a source of water supply, such for instance as from a city's mains. A flexible tubing 8, preferably of rubber though it may be of other material, leads from the pipe 7 into a cup 9 and connects with the drinking nozzle 10 from which the water is discharged to the exterior of said cup, the waste water overflowing into the bowl 5, the overflow passing through the opening 6. The cup 9 is provided with a handle 11 to permit the user to lift the cup.

As is clearly illustrated in the drawing, the flexible tubing 8 is coiled within the base of the stand or bowl 5 in such manner that it may be readily withdrawn to permit the user to lift the cup to his or her mouth.

It is a well known fact that diseases of various kinds are communicated from one person to another by the use of public drinking cups. An attempt has been made to remove this trouble by providing nozzles from which water constantly flows, but said nozzles are ordinarily fixedly located and it is necessary for the user to bend and bring the lips to the nozzle instead of bringing the nozzle to the lips. In the present structure, I provide an ever-flowing nozzle but with convenient means for bringing the nozzle to the lips, together with means for taking care of the overflow, and this in a structure that is neat and ornamental.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim is:—

1. In a sanitary drinking fountain, the combination with a hollow stand, a bowl and an upstanding projection in said bowl, of a source of water supply, a flexible tube located in said stand, and extending upwardly through said projection, a liftable cup adapted to normally rest on said projection, a nozzle carried by said cup with which said tube is connected, and a handle carried by said cup.

2. In a public drinking fountain, the combination with a hollow stand, a bowl and an upstanding central projection in said bowl, of a source of water supply, a coiled flexible tube located in said stand and extending upwardly through said central projection, a cup adapted to be seated upon said central projection, a nozzle carried by said cup with which said flexible tubing is connected, and a handle carried by said cup.

3. In a public drinking fountain, the combination with a hollow stand, a bowl and an upstanding central projection in said bowl, of a source of water supply, a coiled flexible tube located in said stand and extending upwardly through said central projection, a cup adapted to be seated upon said central projection, and a nozzle carried by said cup with which said flexible tubing is connected.

4. In a public drinking fountain, the combination with a hollow stand, a bowl, an overflow channel leading from said bowl, an upstanding central hollow projection in said bowl having a flat upper face and projecting above the entrance to the overflow channel, a source of water supply, a flexible tube coiled within said hollow stand, a cup adapted to have a seating upon the flat upper face of the upstanding projection to which cup one end of the tube is connected, the other end of said tube being connected to the source of water supply.

In testimony whereof, I affix my signature in the presence of two witnesses.

FREDERICK GEORGE PARTINGTON,

Witnesses:

E. L. GRANDY,

M. J. HILLS.

Copies of this patent may be obtained for five cents each, by addressing the "Commissioner of Patents, Washington, D. C."